United States Patent [19]

Eisenack

[11] Patent Number: 5,142,689

[45] Date of Patent: Aug. 25, 1992

[54] PROCESS FOR THE PREPARATION OF THE CONNECTION OF ONE OF SEVERAL DATA PROCESSOR DEVICES TO A CENTRALLY SYNCHRONIZED MULTIPLE LINE SYSTEM

[75] Inventor: Joachim Eisenack, Paderborn, Fed. Rep. of Germany

[73] Assignee: Siemens Nixdorf Informationssysteme AG, Fed. Rep. of Germany

[21] Appl. No.: 529,788

[22] Filed: May 25, 1990

Related U.S. Application Data

[63] Continuation of Ser. No. 430,547, Sep. 30, 1982, abandoned.

[51] Int. Cl.[5] .............................................. G06F 15/16
[52] U.S. Cl. .................................. 395/800; 364/16.2; 364/240; 364/247; 364/927.93; 395/325
[58] Field of Search ... 364/200 MS File, 900 MS File; 340/825.50

[56] References Cited

U.S. PATENT DOCUMENTS

| | | | |
|---|---|---|---|
| 3,813,651 | 5/1974 | Yamada | 364/200 |
| 3,997,896 | 12/1976 | Cassarino, Jr. et al. | 364/200 |
| 4,096,572 | 6/1978 | Namimoto | 364/200 |
| 4,229,791 | 1/1980 | Levy et al. | 364/200 |
| 4,236,203 | 11/1980 | Curley et al. | 364/200 |
| 4,237,535 | 12/1980 | Wiedenman | 364/200 |
| 4,281,380 | 7/1981 | DeMesa, III et al. | 364/200 |
| 4,442,502 | 4/1984 | Friend et al. | 364/900 |
| 4,467,418 | 8/1984 | Quinquis | 364/200 |
| 4,470,112 | 9/1984 | Dimmick | 364/200 |
| 4,470,114 | 9/1984 | Gerhold | 364/200 |
| 4,499,538 | 2/1985 | Finger et al. | 364/200 |

Primary Examiner—Thomas C. Lee
Assistant Examiner—L. Donaghue
Attorney, Agent, or Firm—Varnum, Riddering, Schmidt & Howlett

[57] ABSTRACT

A multiple processor network with a centrally synchronized bus in which a processor desiring to be on line sends a request signal via the bus to an arbiter which generates an allocation signal.

10 Claims, 10 Drawing Sheets

PROCESS FOR THE PREPARATION OF THE CONNECTION OF ONE OF SEVERAL DATA PROCESSOR DEVICES TO A CENTRALLY SYNCHRONIZED MULTIPLE LINE SYSTEM

This is a continuation of application Ser. No. 06/430,547, filed Sep. 30, 1982, now abandoned.

INTRODUCTION

The invention relates to a process for preparing the connection of one of several data processing units to a centrally synchronized multiple line system (bus) for the purpose of transmitting information signals between the data processing units, in which the units needing to be connected-in deliver request signals by way of the multiple line system to at least one allocating unit (arbiter) and the latter by means of the allocation signals generated by it gives rise to the connecting-in of one of the units with a connecting-in need to the multiple line system, after which this unit transmits information signals to another unit.

BACKGROUND OF THE INVENTION

A process of this type is carried out when a number of data processing units are to be connected by way of a single multiple line system. If the data processing units are processors then such a system is designated as a multiprocessor system. In order to simplify the following description, a data processing unit disconnectable on a multiple line system is therefore designated as a processor, although the connecting-in of other types of data processing units is conceivable also. Moreover the multiple line system will be referred to in the following as a "bus" in agreement with the terminology familiar to one skilled in the art.

Within a system constructed with such a bus, the individual processors or other data processing units which are to be connected with other processors are connected into the bus one after another in time. The sequence of this connecting-in is determined by one central or a number of local allocating units (arbiters) which operate in accordance with an algorithm stored in them. When a processor is to be connected into the bus, in order to be connected with another processor or with a global memory, it delivers a request signal by way of the bus, whereby the central or a local allocation unit is caused to allocate the bus to the requesting processor according to the algorithm stored in this unit, so that this processor can then be connected with the bus. When a number of processors transmit a request signal, then the allocation algorithm brings about a selection of one of the requesting processors, to which the bus is then allocated, so that it can hold it.

During the holding, the respective processor can correspond with and exchange information signals by way of the bus with other processors or data processing units such as memories or input/output devices. In order to keep the number of signal lines in the bus as small as possible, address signals and data signals are transmitted one after another in time during such a connection. For this, a flag signal is given as to whether the information signals transmitted are address signals or data signals, which is done by flag signals which are transmitted over other signal lines in the bus parallel to the address or data signals. Since such flag signals identify the type of the respective information signals transmitted, they are designated in the following as information type signals. The address or data signals in distinction from this are designated as information value signals.

The signal transmission on the bus can be carried out dependent on clock signals from a central bus clock generator. This facilitates maintaining the correct time sequence of the signals transmitted and makes possible a characterization with time of the validity of the information type signals and the information value signals. Besides this, the bus clock controls the mode of operation of the allocation, since the bus is to allocate a number of processors one after another by means of this clock.

A system of the type described above requires a relatively large number of bus signal lines. Although the very same signal lines are utilized for transmitting the address signals and the data signals, further signal lines are required for forming connections between the separate processors for the further functions discussed above of a flag, allocating, bus clock control and also of addressing, which further lines only fulfill control purposes, but cannot be utilized for information signal transmission proper. If the number of signal lines is reduced, then the operating speed of the system is also reduced.

SUMMARY OF THE INVENTION

It is the problem of the invention to provide a capability for the more economical utilization of the available signal lines of a multiple line system, through which the number of signal lines required can be reduced while largely maintaining the operating speed.

This problem is solved, for a process of this type mentioned at the outset, by having the request signal transmitted, during a connection already existing, in those intervals of time in which no information signals are being transmitted by reason of the read and/or write operations, and by having the allocation signals generated in time intervals of this kind and/or during the transmission of read information signals.

The kind of feed of the request signal and generation of the allocation signals during an already existing connection, as provided according to the invention, means that the bus signal lines can be utilized in a manifold way. Thereby it is possible to save on signal lines, since the request signals and if necessary the allocation signals can be transmitted over the same lines.

It is an important consideration here that the signal lines used for information value signals must transmit no information value signals when a signal processing with an unavoidable time delay takes place in the respective data processing unit connected with the bus. Such an interval of time is the access time which a memory device requires to deliver the stored information after the address of a storage cell is delivered. That is, this involves a time delay which exists during a reading access between the address transmission for a memory device and the transmission of the data from the addressed storage cell. During this time the signal lines which are normally used for the transmission of information value signals are used for the transmission of request signals and if necessary of the allocation signals. When further data processing units or processors which are to be connected into the bus during such a reading access deliver a request signal by way of the bus to an arbiter, then this signal transmission can be placed in the access time. Thus information value signals of different kinds are then transmitted at different times over the same signal lines, so that for this request operation no additional signal lines are required.

For the interval of time in which no information signals are transmitted between processors connected into the bus, consideration may also be given to the write time in the write access to a memory unit. The write time is that time which a memory unit requires, after the addressing of a storage cell, to write information in this.

Since the receiving of a request signal in an arbiter is immediately followed by the generation of the allocation signal, this generation falls in an interval of time in which either a read or a write operation is still taking place or else read information is being transmitted over the bus after a read process. Hence despite the possible reduction in the number of signal lines required, no additional expenditure of operating time is caused, since the allocation signals are generated in a time interval when the other operations are proceeding namely a memory access and/or the subsequent transmission of the information signals read.

According to a further development of the invention the request signals and if necessary the allocation signals are transmitted over the signal lines of the multiple line system which are continuously assigned to the respective requesting unit. The result of this is that any special expense for address coding is eliminated. The continued assignment of signal lines is possible in view of the time intervals free of information signal transmission which have been described.

The continuous assignment of signal lines for the transmission of request signals or allocation signals to the individual processors requires circuit detail measures which can advantageously also be utilized for other time intervals, in order to transmit information signals over the continuously assigned signal lines which signals serve for the direct driving of a certain processor. Such signals may in particular be address signals. Such address signals can also be transmitted simultaneously to a number of processors, due to the continuous assignment of the signal lines. A variation in the nature of addresses transmitted in such a way is then possible on signal lines with an extremely small additional complexity, since then an additional signal line can respectively be used as an information type signal line in order to identify the kind of address transmitted on the continuously assigned line. Thus for example by this principle it is possible directly, i.e. without additional decoder expense, to clear one or more processors selectively, to control them in a so-called interrupt operation or to allocate to them, and if necessary release them from, certain operating means.

An advantageous further development of the process according to the invention consists in having a status signal generated during a read operation, which signal states the access time of the memory in question and can be used as a condition for the transmission of request signals. The result of this is that a processor connecting-in to the bus can deliver its request signal to the bus even during a currently proceeding memory accessing and need not wait until about the end of this accessing or the start of a new one. This makes possible a further decrease in time expended which is required for the preliminaries for connecting in a processor to the bus.

Depending on the type of memory units used with the multiple line system, their access time can be very short, which signifies that the transmission of the request signals is to be arranged in a correspondingly short time interval. Thereby at the same time more operating time is available for the generation of the allocation signals in the arbiter. Here the process according to the invention can be developed further by having the period of the central clock signal correspond to the transmission time over the multiple line system, since the request signals transmitted can be input into synchronously loadable receiving registers with single-edge control, having the edges of the clock signals determine this input and by having the control signals for this input fed to the loading inputs of the receiving register.

This further development of the invention makes possible a very accurate definition of the instant of which the receiving registers take over the request signals transmitted over the bus. Through the edge control of the receiving registers with the clock signals in combination with the above-mentioned proportioning of their period, it is achieved that for example the transmitting process is driven with the one active edge of the clock signal and immediately upon the succeeding active clock signal edge, the receiving process can be brought about in a receiving register. At the same time the fact that the control signals for the input of received request signals are delivered to the receiving registers at their loading inputs involves the advantage that these control signals can be handled like information signals and therefore need have no high edge steepness. Then this need only be required for the clock signals, so that in a multiple line system only the clock signal lines must be operated as closed lines with strong driving amplifiers, whereas no correct line termination is required and relatively weak signal driving amplifiers can be used. This principle of nonuniform handling of the signal lines in a multiple line system also has an independent significance and can also find use for the transmission of other control or information signals besides the request signals or the allocation signals, as is yet to be described.

Moreover the further advantage is offered that the described kind of use of the single-edge-controlled and synchronously loadable receiving registers can very easily be performed, since their input signals need only remain stable for a very short time in order to set off switching operations in them.

BRIEF DESCRIPTION OF THE DRAWINGS

The invention is described further in the following on the basis of the figures in which.

DETAILED DESCRIPTION OF ILLUSTRATIVE EMBODIMENT

Figure 1:
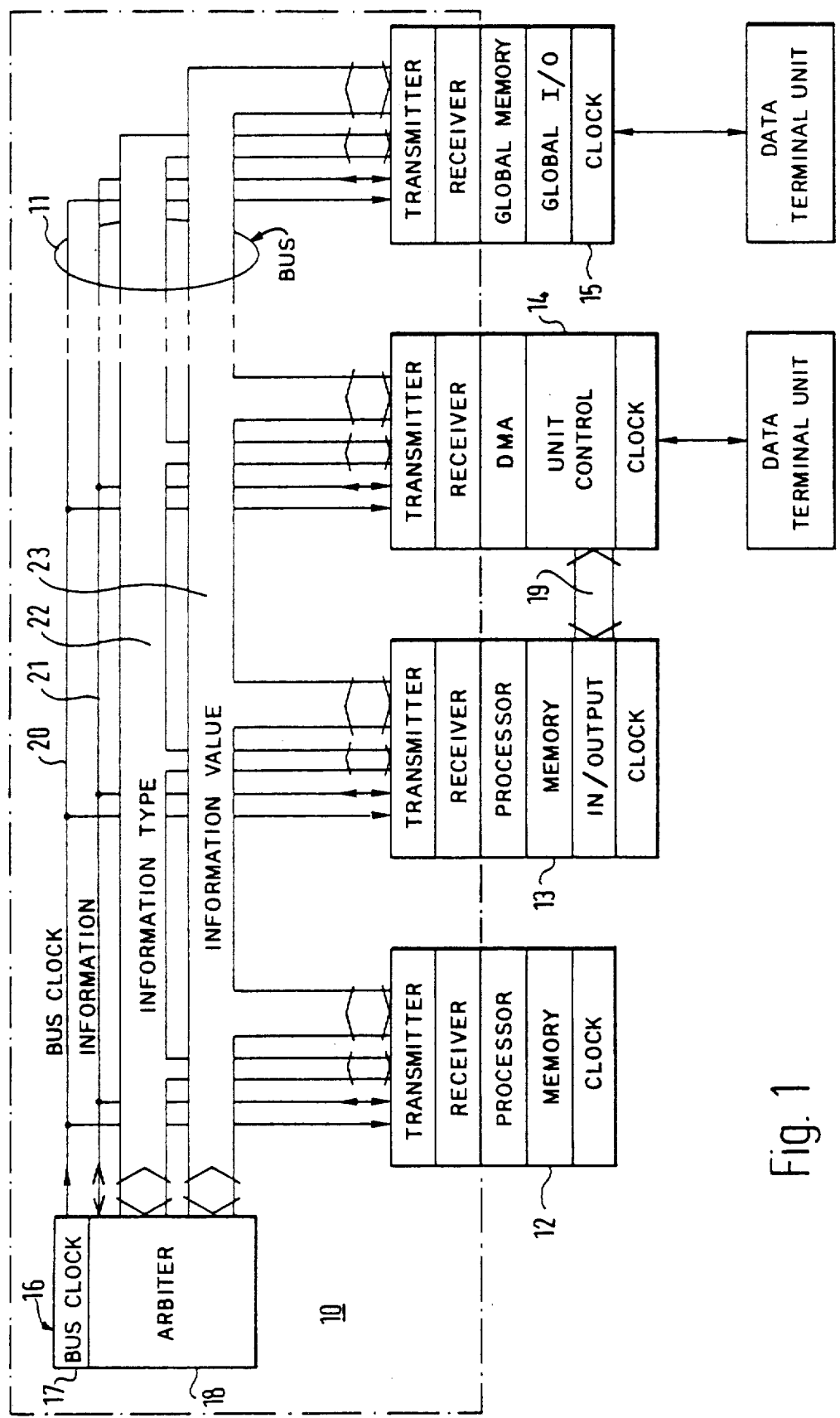
FIG. 1 shows the general structure of an information signal transmission system in which the invention is used.

FIG. 1 shows the general structure of an information signal transmitting system 10 in which a multiple line system 11, designated as a bus in the following, serves for transmitting information signals and control signals. Connected onto the bus 11 are a number of data processing units 12, 13, 14 and 15 which can come into connection with one another by way of the bus. Also connected to the bus 11 is a central unit 16, which includes a central bus clock generator 17 and a central allocator 18, which in the following is designated as an arbiter. The data processing units 12 to 15 may be differently constructed units. Thus for example the units 12 and 13 are processor units which respectively contain signal transmitters, signal receivers, a processor, a local memory and their own clock generator. The unit 14 is a so-called DMA unit and contains signal transmitters, signal receivers, a DMA unit for direct memory access, an apparatus control belonging to this and its own clock generator. The unit 15 is a global memory unit and contains signal transmitters, signal receivers, a global memory, a global input-output circuit and its own clock generator. The units 14 and 15 are respectively in connection with one data terminal unit on which data can be input or output or displayed. Between the units 13 and 14 is denoted a multiple connection path 19 by way of which the processor unit 13 can also come directly into connection with the DMA unit 14 without the bus 11 being used for this.

The bus 11 consists of a group of a number of signal lines on which the respective possible transmission direction of signals is represented by arrows. A central bus timing signal line 20 is provided by way of which the central bus clock generator 17 delivers its bus clock signal in parallel to all of the data processing units which can be connected in to the bus 11. Moreover, signal lines 21 are provided for transmitting information signals, signal lines 22 for transmitting information type signals and signal lines 23 for transmitting information value signals, such as for example addresses and data in time sequence.

The general structure of an information transmission system represented in FIG. 1, as was already explained at the start, makes possible any desired correspondence between two or more data processing units. Each data processing unit 12 to 15 can, in case there is a need in its region for connecting into the bus 11, deliver a request signal to the central arbiter 18 which if necessary will allocate the bus 11 to the requesting unit, so that this can be connected into the bus 11. In case of a number of simultaneous requests from data processing units, the central arbiter 18 decides according to an allocation specification stored in it as an algorithm, which of the requesting data processing units should be connected in first to the bus 11 and what the connecting-in sequence of the rest of the requesting units is to be. Basically the invention is also applicable to systems with local allocation in which each data processing unit connectable to the bus contains an arbiter.

Figure 2:
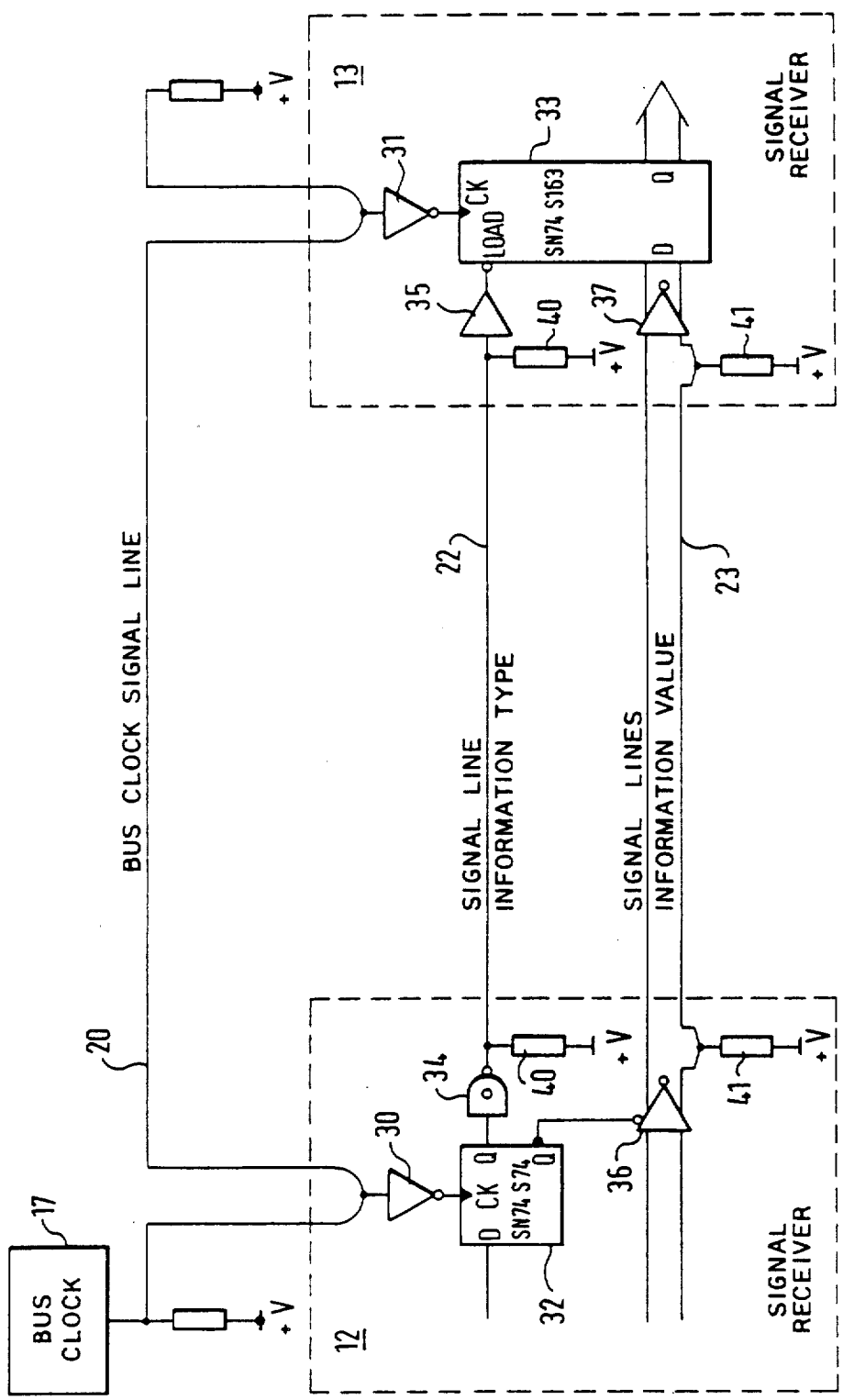
FIG. 2 shows a general view to illustrate the transmission of clock signals and information signals in a multiple line system with the use of the invention.

FIG. 2 represents in a simplified way the type of signal transmission used in principle in the invention with control by the bus timing signal between the data processing units 12 and 13. Parts of a signal transmitter are shown for the unit 12 and parts of a signal receiver for the unit 13. The two units 12 and 13 are connected together in the manner described by way of the bus timing signal line 20, an information type signal line 22 and information value signal lines 23. The bus clock signal of the central bus clock generator 17 is delivered over the bus clock signal line 20 to the two units 12 and 13, where one clock signal input amplifier 30 or 31 each is provided. The bus clock signal then controls a single-edge-controlled transmitting register 32 in the signal transmitter and a single-edge-controlled, synchronously loadable receiving register 33 in the signal receiver. The transmitter register 32 is for example of the SN74S74 type, the receiving register of the type SN74S163. FIG. 2 shows the connection of the transmitting register 32 with the receiving register 33, as regards the information value signals over a number of signal lines 23, which means that, depending on the type of respective information value signal transmitted, further receiving registers can be connected with the signal line 23.

The control of the signal transmission between the two data processing units or processors 12 and 13 by the central bus clock signal is then done in such a way that the information signal with an active edge is delivered to the information value signal lines 23 and taken over in the receiving register 33 with the next successive active edge of the bus clock signal. At the same time criteria are transmitted over the information type signal line 22 which identify which type of signal is respectively involved in the information value signals which are transmitted over the signal lines 23.

The transmitting register 32 delivers the information type signals, controlled by the abovementioned active edge of the bus clock signal, by way of a signal transmitter 34 to the information type signal line 22, and these information type signals go by way of an input receiver 35 to the load input LOAD of the receiving register 33. At the same time as the delivery of the information type signals through a bus clock pulse, a control signal is delivered to the control input of a gate 36, which is a Tri-State or Open-Collector driving, circuit, whereby this feeds the information value signals, arising in a manner not represented, to the information value signal lines 23, so that they can be taken over with the next successive bus clock pulse by a receiver 37 in the receiving register 33. By way of the Q outputs the received information value signals are further interpreted in a manner not represented.

It must be recognized that the control signals which are transmitted over the information type signal lines 22 are treated as information value signals. The control signals drive the control input LOAD of the receiving register 33 which causes the input, while the information valve signals reach its data inputs D. At the same time the active edge of the bus clock signal drives the clock input CK of the receiving register 33 and determines the instant of the registering of the control signals and the information value signals.

Between the signal transmitter shown in FIG. 2 and the signal receiver no special information processing takes place such as would be the case for example with an address comparison. Thus there is no time interruption or delay on the transmission path, so that the time required for transmission of the information signals is kept very short and corresponds to one bus clock signal. Since therefore the minimum period of the central bus clock signal depends only on the physical properties of the line system, it can respectively be optimized to the existing line system, i.e., be chosen to be as short as possible. With a physically "short bus", physically correct closed signal lines can be dispensed with, with the exception of the bus clock signal lines, so that relatively high-valued resistors can be used as the terminating resistors, which are shown in symbols as 40 and 41 in FIG. 2. This in turn means that the output signal amplifier for the signal lines, with the exception of the bus clock signal line 20, can have a relatively low power output, which in turn is connected with the longer rise times and drop-out times, already discussed, of the transmitted signals, which confirm the physical state of the "short bus". The disadvantage now arising of the long rise and drop-out times of the control signals when they are used directly for taking over the information value signals in the receiving register 33 would have the result that the instant of the takeover of the information value signals in the receiving register 33 cannot be accurately determined, wherewith an unnecessarily long time must be made available for the correct delivery of the information values. This disadvantage is eliminated however by making it possible within the scope of the invention for the information type signals to be handled like information value signals and transmitted in the same way as these over a signal line continuously assigned during the request and the allocation. The bus clock signal line 20 is then operated with a signal driver of higher power output, so that it can be considered a physically closed signal line and thus clock pulse edges with a smaller rise and drop-out time can be transmitted. The resulting active steep edge, with a one-edge-driven synchronously loadable receiving register, determines the instant of takeover of the information type signals and the information value signals very accurately.

Figure 3:
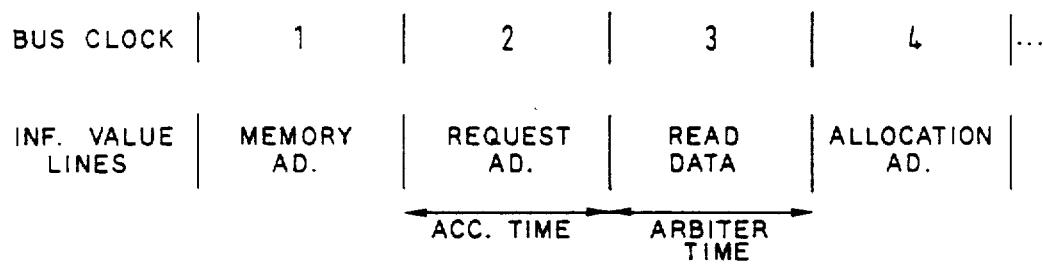
FIG. 3 shows a representation of the time lapse of the transmission of request signals and of the generation of allocation signals in the invention.

It may now be assumed for example that one of the data processing units 12 to 14 shown in FIG. 1 is to make connection with the global memory unit 15, in order to carry out a read access. It may be assumed further that one of these data processing units is already maintaining a connection with this global memory unit 15 and that an exchange of information with the global memory present there is already taking place. FIG. 3 shows that in the course of this information exchange over the information value signal lines 23 during the bus clock period 1 memory address is transmitted by this unit. The bus clock period 1 is followed by the bus clock period 2, during which the access time of the thus triggered global memory runs, that is, the time that the memory requires after driving by the memory address to deliver data. This time is accordingly a time interval during over the information value signals can be transmitted over the information value signal lines 23. During this time interval another data processing unit can transmit a request signal over an information value signal line 23 to the central arbiter 18 (FIG. 1) so as to initiate another connection. This request signal is designated as a request address, since it has to do with the address of the requesting unit or of the requesting processor. In the bus clock period 3 the arbiter 18 processes the request address and determines an allocation address, while at the same time the read data from the global memory are delivered to the unit already connected with it, since the access time has expired. After the arbiter 18 has calculated the allocation according to the allocation algorithm stored in it, after the end of the read access, it delivers the allocation addresses determined to the bus 11 in the bus clock period 4 by way of the information value signal lines 23, which addresses are received by the data processing unit addressed in this way, so that the latter can be connected into the bus 11, then a memory access can be carried out starting from the connected-in unit.

It should be recognized that the access time of the memory as well as the time in which the read data are transmitted is utilized for, on the one hand, transmitting a request address of another data processing unit to be connected to the bus, by way of the information value signal lines 23 and, on the other hand, for calculating an allocation within the central arbiter 18, following which the allocation address can then be transmitted over the information value signal lines 23. Although an additional time interval is required for this latter allocation, by utilizing the memory access time and the time in which read data are subsequently delivered from the memory, a saving of time is achieved which is greater than the time required for transmitting the new allocation address.

Since a number of information value signal lines 23 are present within the bus 11, which can carry no memory data during a memory access in progress, one of these lines can continuously be assigned to a data processing unit as a request address line or allocation address line. A substantial advantage of this process is that through this continuous assignment of information value signal lines no special decoding of the processor addresses or other addresses for data processing units which are to be connected into the bus is necessary. The continuous assignment can be achieved within one system for example by permanent wiring of the information signal lines with the existing data processing units, or if necessary also be effected with mechanical selector switches.

Analogously to the process described above, one data processing unit may drive not only a global memory unit but also the local memories of another data processing unit by way of the bus 11.

Figure 4:
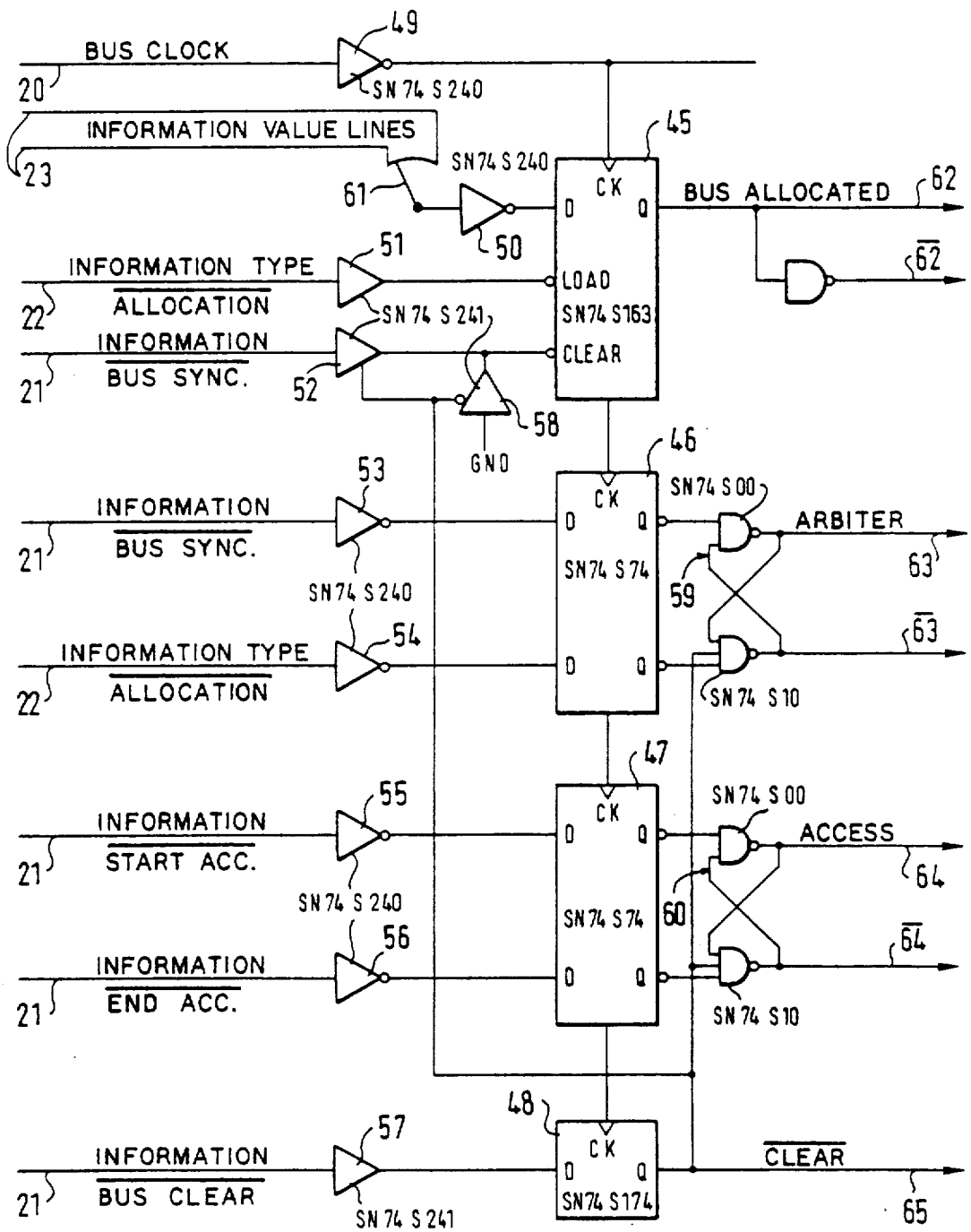
FIG. 4 shows a circuit arrangement for generating status signals.

The performance of the process according to the invention requires the generation of status signals. For this purpose FIG. 4 shows a circuit arrangement which is very simple in construction and operates by the principle already described on the basis of FIG. 2. A number of receiving registers controlled by the bus clock are driven with information value signals, information type signals and information signals and, depending on the type of driving, deliver status signals which can be handled in a data processing unit connected into the bus or in the central arbiter 18 for requests or allocation. A circuit arrangement of the type shown in FIG. 4 can therefore be provided in each of the data processing units 12 to 15 shown in FIG. 1 and also in the central arbiter 18.

FIG. 4 shows as the essential components of this circuit arrangement four receiving registers 45, 46, 47, 48 which at their clock inputs CK are driven by the clock signal of the bus clock signal line 20, which for this purpose is connected by way of an inverting receiver of the type SN74S240. The receiving registers 45, 46, 47 and 48 are driven at their inputs respectively by way of an inverting or noninverting receiver 51, 52, 57, 58 of the SN74S241 type of 50, 53 to 56 of the SN74S240 type, which if necessary are also used as Tri-state drivers. The two receiving registers 46 and 47 are connected at the Q and $\overline{Q}$ outputs with bistable circuits 59 and 60 which respectively consist of two NAND elements of the types 74S00 and 74S10 connected together in a known way and retaining the switching state set in them or the output signal delivered with them long enough until they are driven by the respective receiving register 46 or 47 for a new signal change. The receiving registers 45, 46 and 47 are of the SN74S163 or SN7H4574 type. The receiving register 48 is of the SN74S174 type.

The information value signal lines 23 of the bus 11 (FIG. 1) are led to a mechanical selector switch 61 which in the manner already described assigns one of the information value signal lines 23 of the circuit shown in FIG. 4 and permits the driving of the receiving register 45 with an information value signal by way of the receiver 50. Information type signal lines 22 and information signal lines 21 are provided as further input lines for the circuit arrangement shown in FIG. 4. These feed to the circuit arrangement the information type signals $\overline{\text{ALLOCATION}}$ as well as the information signals $\overline{\text{BUS SYNC}}$, $\overline{\text{START ACC}}$, $\overline{\text{END ACC}}$ and $\overline{\text{BUS CLEAR}}$. As the outputs signals, the status signals BUS ALLOCATED, ARBITER, ACCESS and $\overline{\text{CLEAR}}$ are then delivered at the outputs 62, 63, 64 and 65, or their inversions at the outputs $\overline{62}$, $\overline{63}$ and $\overline{64}$.

For the Tri-State drivers 52 and 58 used as receivers, a connection of the driving inputs with the output 65 $\overline{\text{CLEAR}}$ is represented, which in a known manner ensures that the circuit arrangement in connection with the bus 11 at the clearing input CLEAR of the receiving register 45 and also at the bistable circuits 59 and 60 can be brought into a defined initial state by having the signal $\overline{\text{CLEAR}}$ at these points to ensure a defined state. The driving of the receiving register 48 with the information $\overline{\text{BUS CLEAR}}$ causes all of the processors or data processing units connected into the bus 11 to be switched into a defined state conforming to one another simultaneously with the end of the clearing operation.

The circuit arrangement shown in FIG. 4, because of its use of the signal transmission principle already described on the basis of FIG. 2, is very simple in construction and contains only four receiving registers. It should be recognized that for example the status signal BUS ALLOCATED on the output 62 is brought about by the driving of the receiving register 45 in the manner described with an allocation address by way of an information value line 23, with the information type signal $\overline{\text{ALLOCATION}}$ and with the absence of the information signal $\overline{\text{BUS SYNC}}$. The other receiving registers 46, 47 and 48 are driven similarly for generating the corresponding status signals on the outputs 63, 64 and 65.

Figure 5:
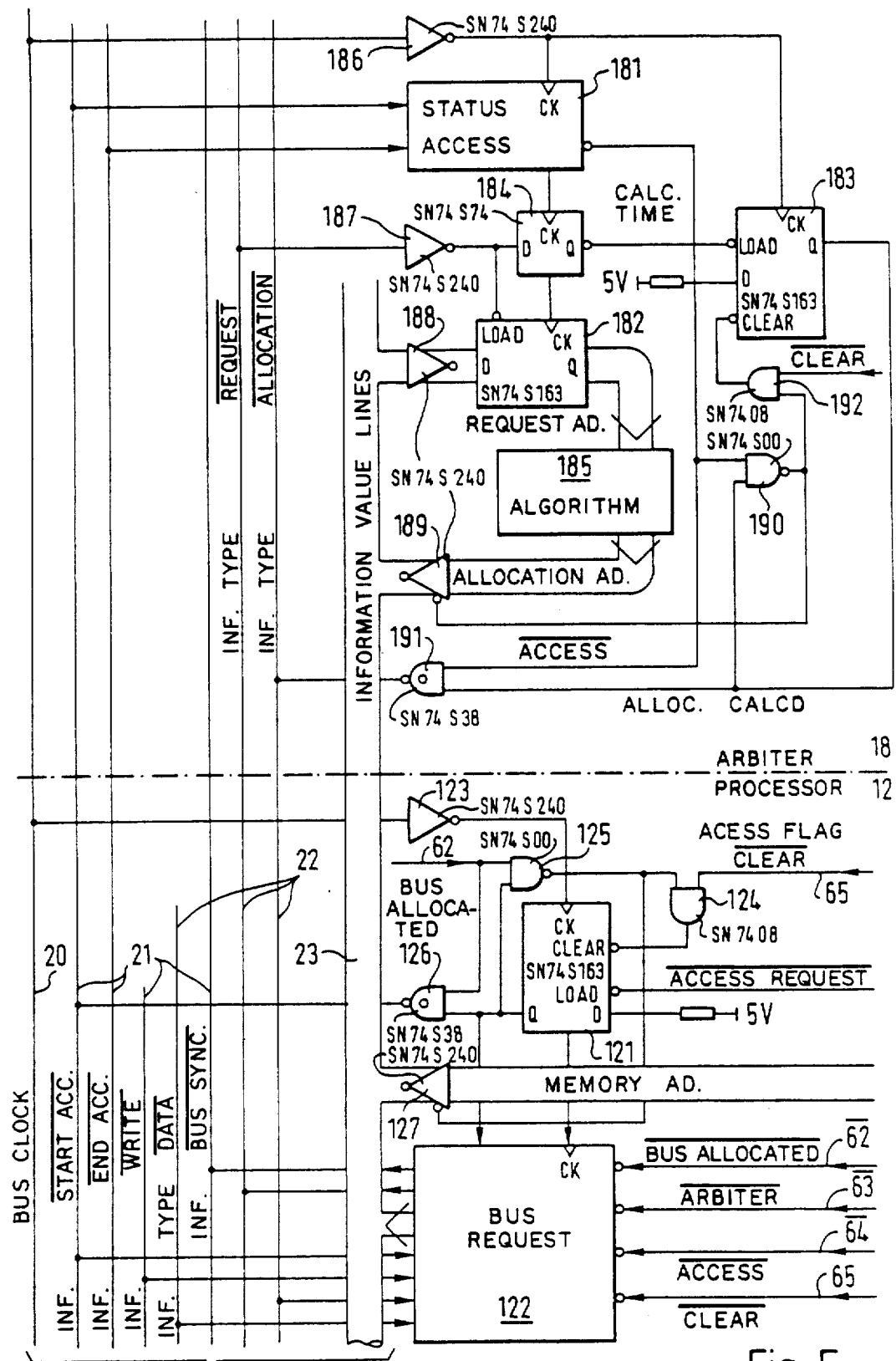
FIG. 5 shows a part of a processor relevant for the request or allocation and also an arbiter which are all connected to one another by way of a bus.

In FIG. 5 the arbiter 18 and the processor are represented diagrammatically in combination with a segment of the bus 11. In the following will be described which functional units relevant to the process according to the invention are contained in the arbiter 18 and in the processor 12. The processor 12 is shown only as an example of a data processing unit to be connected with the bus 11. A DMA unit could also be used here in the same way, as has already been described on the basis of FIG. 1.

FIG. 5 shows the bus 11 with its individual signal lines 21, 22 and 23 for information, information type and information value signals and also with the bus clock signal line 20. The information signal lines 21 and the information type signal lines 22 and also the information value signal lines 23 carry the various signals relevant to the process according to the invention, as was already explained on the basis of FIG. 4. In addition, an information signal line for $\overline{\text{WRITE}}$ and an information type signal line for $\overline{\text{DATA}}$ are provided.

The functional groups of the arbiter 18 and of the processor 12 shown in FIG. 5 receive signals from the individual signal lines of the bus 11 and deliver signals to these lines. The arbiter 18 contains a circuit 181 for generating a status signal $\overline{\text{ACCESS}}$, a register 182 for receiving a request address by way of the information value signal lines 23, a circuit 183 for delivering a signal ALLOC. CALCULATED, a register 184 for delivering a signal which characterizes the calculation time and feeds this signal to the circuit 183, and also a circuit 185 in which an allocation algorithm is formed, for example as a table within a programmable read only memory. The registers 182 and 184 are driven by the principle already explained on the basis of FIG. 2 and also deliver their signals in a corresponding manner. Inverting transmitters and receivers 186, 187, 188 and 189 are used for this and also for receiving the bus clock. The transmitter 189 is operated as a Tri-State driver and contains a corresponding control signal from a NAND element 190 which is driven by the status signal $\overline{\text{ACCESS}}$ and by the signal ALLOC. CALCULATED. A NAND element 191 operating by the Open-Collector principle is driven by the status signal $\overline{\text{ACCESS}}$ and by the signal ALLOC. CALCULATED and delivers its output signal $\overline{\text{ALLOCATION}}$ to an information type signal line 22.

An AND element 192 controls the clear input of the register 183 and receives as input signals the status signal $\overline{\text{CLEAR}}$ and the output signal of the NAND element 190. The circuits 181, 182, 183 and 184 are clock-controlled by the bus clock by way of the inverting receiver 186 and at their clock inputs CK are connected together for this.

The calculator time register 184 is driven by the information type signal $\overline{\text{REQUEST}}$ by way of the inverting receiver 187. The request address register 182 is likewise driven by this signal as well as by information value signals on the corresponding signal lines 23 of the bus 11. Its output signals control the circuit 185 for the allocation algorithm, which in turn delivers an allocation address by way of the, inverting transmitter 189 to the information value signal lines 23.

The circuits 182 and 183 are of the SN74S163 type, the register 184 of the SN74S74 type. The receivers 186, 187 and 188, 189 are of the SN74S240 type. The NAND element 191 is of the SN74S240 type, the NAND element 190 is of the SN74S00 type and the AND element 192 is of the SN7408 type.

The processor 12, as its most important functional elements for carrying out the process according to the invention, contains a register 121 and a generator 122 for the bus request, the structure of which is explained still further in the following. The register 121 is designated as access flag and is of the SN74S163 type. It is clock-controlled from the bus clock signal line by way of an inverting receiver 123 of the SN74S240 type and at its load input LOAD it receives a signal $\overline{\text{ACCESS REQUEST}}$ from the processor when the latter is to be connected into the bus 11. At its clear input CLEAR the register 121 receives the output signal of an AND gate 124 of the SN7408 type, which at its one input receives the status signal $\overline{\text{CLEAR}}$ by way of the output 65 of the status circuit shown in FIG. 4 and at its other input receives the output signal of a NAND element 125 of the SN74S00 type, which is driven by the Q output of the register 121 and by the status signal BUS ALLOCATED by way of the output 62 of the circuit according to FIG. 4. The Q output of the register 121 is connected to the one input of a NAND element 126 of the SN74S38 type, the other input of which is driven with the status signal BUS ALLOCATED. This NAND element 126 delivers its output signal to the information signal line 21 which is then to be designaed as $\overline{\text{START}}$ $\overline{\text{ACC}}$.

As was already explained, if a read access or write access to a memory is to be done over the bus 11, the processor 12 delivers a memory address to the information value signal lines 23. This is done by way of an inverting transmitter 127 of the SN74S240 type operating as a Tri-State driver.

The generator 122 for a bus request is driven by the four status signals, which can be taken from the outputs $\overline{62}$, $\overline{63}$, $\overline{64}$ and $\overline{65}$ and the circuit arrangement according to FIG. 4. This generator is clock-controlled by the clock signal of the bus clock signal line 20 at its clock input CK. At another input it is driven by the output signals at the output Q of the register 121. Besides this, at other inputs it receives the signals $\overline{\text{START}}$ $\overline{\text{ACC}}$, $\overline{\text{WRITE}}$, $\overline{\text{ALLOCATION}}$, and $\overline{\text{DATA}}$. As its output signal the generator 122 delivers information value signals to the information value signal lines 23 and also delivers the signals US/ $\overline{\text{SYNC}}$ and $\overline{\text{REQUEST}}$ to one line each of lines 21 and 22, respectively the bus 11.

When an access request occurs within the processor 12 in the circuit shown in FIG. 5, then this criterion is effective on the load input of the access flag or register 121. If the bus 11 is not allocated, then the access request is stored without further activation of the register 121 and is delivered to the generator 122 for the bus request, which in turn delivers the information $\overline{\text{BUS}}$ $\overline{\text{SYNC}}$ to an information signal line 21. This signal ensures that the status BUS ALLOCATED occurs on none of the data processing units connected with the bus 11 ($\overline{62}$, FIG. 4) so that this criterion will be ascertained in these units as a whole, which means that the allocation of the bus to the previous processor is cancelled and that now the no longer assigned bus 11 can be allocated to the requesting processor 12. The generator 122 generates the information $\overline{\text{BUS}}$ $\overline{\text{SYNC}}$ and then the informaton type signal $\overline{\text{REQUEST}}$ together with the individual processor address as an information value signal. This is then transmitted by way of a continuously assigned information value signal line 23 to the arbiter 18 and there together with the information type signal $\overline{\text{REQUEST}}$ this is accepted in the request address register 182. The information type signal $\overline{\text{REQUEST}}$ also sets the calculation time register 184 and this sets the circuit 183. In this manner the minimum time for the calculation of the allocation address is defined.

If the status $\overline{\text{ACCESS}}$ determined with the circuit 181 does not exist, then with the signal $\overline{\text{ALLOC}}$ $\overline{\text{CALCU}}$ $\overline{\text{LATED}}$ the allocation address is delivered to the information value signal lines 23 as an information value signal and by way of the NAND element 191 the information type signal $\overline{\text{ALLOCATION}}$ is delivered to an information type signal line 22.

But if the status $\overline{\text{ACCESS}}$ does not exist, then the allocation is prevented by the two NAND elements 190 and 191 until the status $\overline{\text{ACCESS}}$ occurs. The end of a particular access in progress is thus anticipated.

If the processor 12 receives the information type signal $\overline{\text{ALLOCATION}}$ and the allocation address, then it reaches the status of BUS ALLOCATED, which the circuit shown in FIG. 4 with the allocation register 45 generates. This status signal activates not only the register 121 set by the access request but also the delivery of the information $\overline{\text{START}}$ $\overline{\text{ACC}}$ by way of the NAND element 126 and of the information value signal $\overline{\text{MEM}}$ $\overline{\text{ORY}}$ $\overline{\text{AD}}$ by way of the transmitter 127, whereby a connection is formed with the memory of another data processing unit by way of the bus 11.

The actions described in a general way above will now be explained on the basis of the time diagrams shown in FIGS. 7 to 10. First the structure of the generator for the bus request will be described on the basis of FIG. 6.

Figure 6:
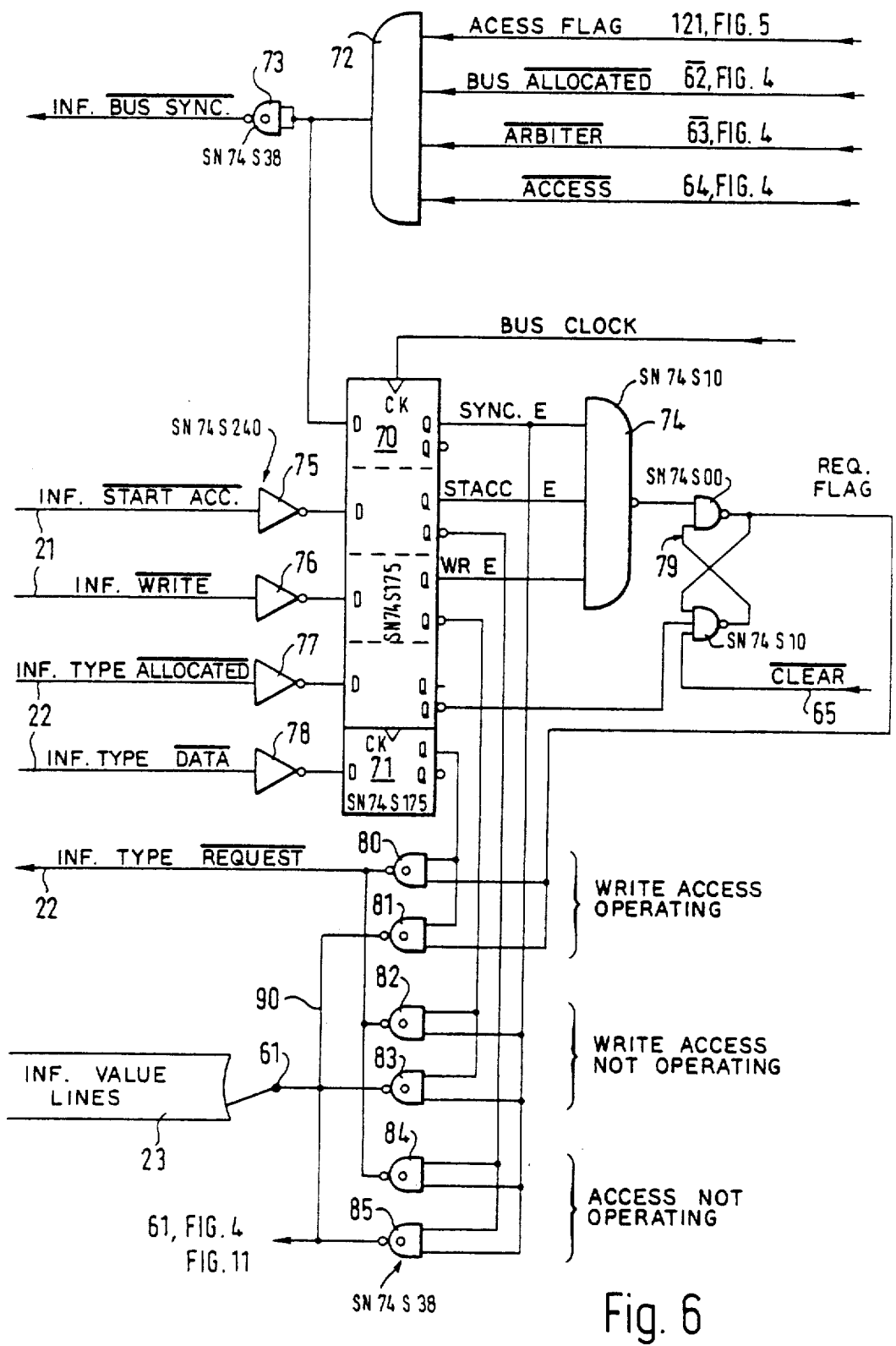
FIG. 6 shows the circuit of a request generator present in the processor according to FIG. 5.

FIG. 6 represents in detail the circuit of the generator 122 (FIG. 5) for the bus request. This generator contains as its essential parts two registers 70 and 71 which are each of the SN74S175 type and are controlled by the clock signals at their respective clock input CK. Three D inputs of the register 70 are driven by the information signals $\overline{\text{START}}$ $\overline{\text{ACC}}$ and $\overline{\text{WRITE}}$ respectively by way of an inverting receiver 75 and 76 of the SN74S240 type. A Third D input is driven by an information type signal $\overline{\text{ALLOCATION}}$ by way of an inverting receiver which is constructed the same as the receivers 75 and 76. A fourth D input is driven by the status signals linked in an AND gate 72, which signals are delivered to the outputs $\overline{62}$, $\overline{63}$ and $\overline{64}$ of the circuit of FIG. 4, and is additionally driven by the output signal of the access flag 121 (FIG. 5). The information $\overline{\text{BUS}}$ SYNC/ is derived from the output signal the AND element 72 by way of a NAND element 73 of the SN74S38 type which operates by the Open-Collector principle and is connected as an inverter, and delivered to an information signal line 21 in the manner shown in FIG. 5.

The information $\overline{\text{BUS}}$ SYNC/ precedes the transmission of request signals. As was already explained, this transmission must take place within a single clock period. Hence it is of interest to generate the information $\overline{\text{BUS}}$ SYNC/ immediately upon the occurrence of an active clock signal edge insofar as possible. The status signals which identify the time instant of the generation of the signal $\overline{\text{BUS}}$ SYNC/, are handled by way of the conjunctive linkage of the AND element 72.

Three Q outputs SYNC E. STACC E and WR E of the register 70, which are activated by $\overline{\text{BUS}}$ SYNC/, $\overline{\text{START}}$ ACC and $\overline{\text{WRITE}}$, are led to a NAND element 74 of the SN74S10 type, the output signals of which together with a Q output signal, activated by $\overline{\text{ALLOCA}}$ $\overline{\text{TION}}$, of the register 70 are fed to a bistable circuit 79, which latter is also driven by the status signal $\overline{\text{CLEAR}}$ from the output 65 of the circuit shown in FIG. 4. The output signal of the bistable circuit 79 is thus retained until a new signal change is brought about at its inputs.

The second register 71 is driven with the information type signal $\overline{\text{DATA}}$ by way of an inverting receiver 78 of the SN74S240 type and at its Q output it delivers a signal which together with the output signal of the bistable circuit 79 drives two of six similar NAND elements 80 to 85. These operate by the Open-Collector principle and are of the SN74S38 type. The two NAND elements 80 and 81 are driven at their first inputs by the Q output signal, activated with $\overline{\text{DATA}}$, of the register 71 and at their second inputs by the output signal of the bistable circuit 79. The two NAND elements 82 and 83 are driven at their first inputs by the Q output signal, activated with $\overline{\text{WRITE}}$, of the register 70 and at their second inputs by the Q output signal SYNC E, activated by its own $\overline{\text{BUS}}$ SYNC/, of the register 70. The two NAND elements 84 and 85 are driven at their first inputs by the $\overline{Q}$ output signal, activated with $\overline{\text{START}}$ ACC, of the register 70 and at their second inputs by the Q output signal SYNC E, activated with its own BUS SYNC/ , of the register 70.

The NAND elements 80 to 85 deliver the information type signal REQUEST to an information type signal line 22, namely in the form of the output signals of the NAND elements 80, 82 and 84. The output signals of the NAND elements 81, 83 and 85 are fed over their connection 90 in common to the mechanical switch 61, with which, in the manner already described for FIG. 4 one of the information value lines 23 is continuously assigned to the processor which contains the generator 122 shown in FIG. 6. The linkage of their input signals achieved by the NAND elements 80 to 85 has the effect shown in FIG. 6 for one respective pair of NAND elements 80 to 85, namely that the NAND elements 80 and 81 deliver an information type signal REQUEST and at the same time deliver a signal to the alloted information value line 23 when a write access goes on the bus 11 with the bus request carried out with the generator. The NAND elements 82 and 83 give such a signal over the bus lines 22 and 23 when there is no write access but rather a read access for example being carried on the bus 11. The NAND elements 84 and 85 deliver such a signal when there is no access at all being carried on the bus 11. In this way the different possible operating states are included when the generator 122 is to start a request for the purpose of carrying out a read access.

Figure 7:
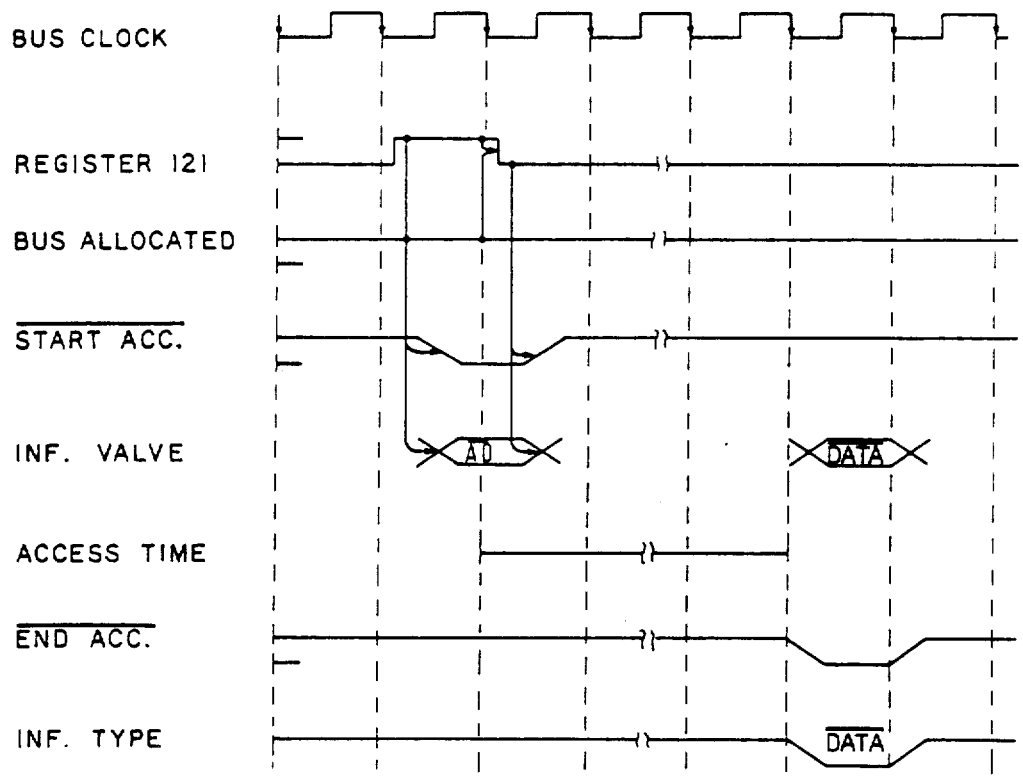
FIGS. 7, 8, 9, 10 show signal forms in the processor and arbiter according to FIG. 5 for different operating states of the system according to FIG. 1.

In the following it is described on the basis of FIG. 7 how a read access by one data processing unit is made over the bus 11 to a memory of another unit or a global unit. For this it is assumed that the bus 11 is already allocated to the data processing unit. FIG. 7 shows the bus clock signal waveform, in which it is denoted that the respective drop-out edge of the bus clock causes a process which is to be controlled by it. The change in voltage level per unit time is represented as relatively small for all of the signals transmitted over the bus 11 with the exception of the bus clock, since the high capacity of the physically short bus signal lines can be recharged only slowly by a relatively weak signal transmitter. On the contrary, the bus clock signal line is driven by a strong signal transmitter with a high voltage level change per unit time, so that the bus clock signal line may be considered as a physically long closed signal line.

As was already explained on the basis of FIG. 6, when a connecting-in request occurs in a processor or in a data processing unit, a register ACCESS FLAG is set which is shown in FIG. 7 in the first signal waveform for the register 121. Since according to the assumption the bus 11 is already assigned to the requesting processor, which the signal BUS ALLOCATED shows, no separate allocation process is further required, so that with the linkage of the signals ACCESS FLAG (register 121) and BUS ALLOCATED, the signal START ACC is produced. This has already been described in connection with FIG. 5, particularly for the NAND element 126. At the start of the access the bus 11 is also allocated to the requesting processor.

FIG. 7 shows, in connection with the dropping-off edge of the bus clock, that the output signal of the register 121 and the signal BUS ALLOCATED (by way of the NAND element 126, FIG. 5) generate the signal START ACC, which in its active state has a binary zero value. At the same time as the signal START ACC, the memory address is then output as information value signal, by means of which address a memory of another data processing unit or the global memory is to be driven by way of the bus 11. This memory address is designated as AD in FIG. 7. The outputting of this memory address AD is done by way of the Tri-State amplifier element 127 shown in FIG. 5, controlled by the output signal of the NAND element 125.

FIG. 7 also shows that the access time begins with the outputting of the memory address AD, during which time the processor or the data processing unit accesses a memory unit by way of the bus 11. At the end of the access time a signal END ACC is produced which in its active state likewise has the binary value zero and is generated in the manner described. At the end of the memory access occurs the output of the data read to the bus 11. This process is represented in FIG. 7 as the information value signal DATA or as an information type signal DATA.

Figure 8:
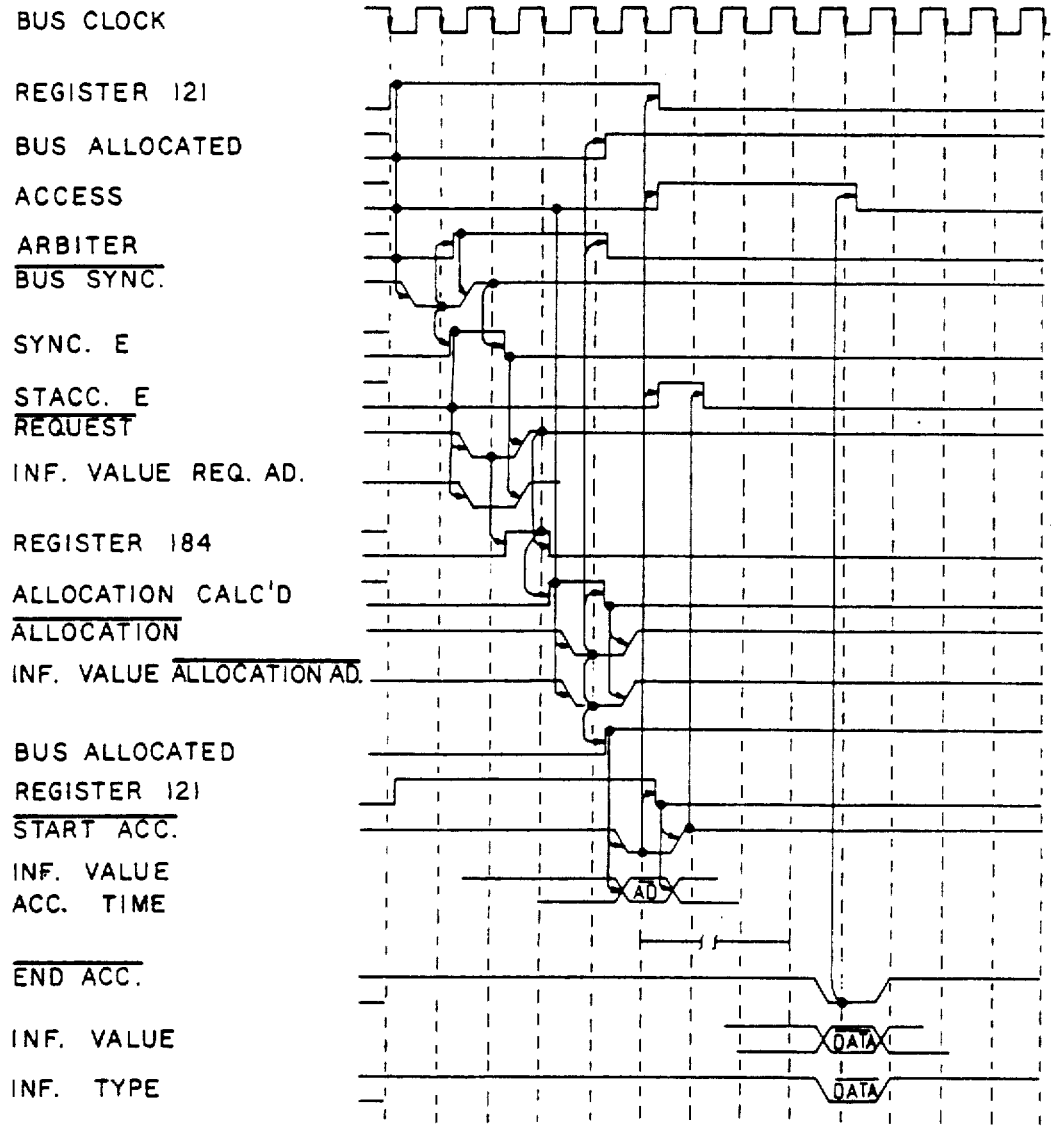

FIG. 8 shows how a read access proceeds for the case where the bus 11 is not yet allocated, but also no other memory access is yet in progress. In contrast to the case described on the basis of FIG. 7, it is assumed, that is, that the bus in its output state is not yet allocated to the processor or data processing unit to be considered here.

FIG. 8 again shows as an assumption of the bus clock, the dropping-off edges of which are active edges, that is, produce further signal processes. According to the above assumption the register 121 ACCESS FLAG is set upon an access request, while the status BUS ALLOCATED does not exist. Besides this the signal ACCESS does not exist, and the arbiter does not operate. In this switching state the driving case shown in FIG. 6 occurs, which is produced with the generator circuit shown in FIG. 4 for the bus request. The AND element 72 shown in FIG. 6 is driven with the signals ACCESS FLAG. BUS ALLOCATED, ARBITER and ACCESS. The AND element 72 by reason of its conjunctive linkage then generates its output signal BUS SYNC, which is converted by the NAND element 73 into a signal BUS SYNC/ , which in its active state has the binary value zero. This process is shown in FIG. 8 for the first five signal waveforms on the basis of the logic linkage denoted there. Since the output signal of the AND element 72 in the circuit shown in FIG. 6 is also fed to the D input of the first stage of the register 70, this delivers at its Q output the signal SYNC E, which is shown in FIG. 8 in such a way that it is caused by the signal BUS SYNC/ . Since the signal START ACC of another processor is lacking, the second stage of the register 70 shown in FIG. 6 delivers no signal STACC E at its Q output, and in combination with the signal SYNC E the NAND element 84 generates the information type signal REQUEST and the NAND element 85 generates the information value of the related processor address as the request address REQUEST AD. These two signals end with the next dropping edge of the bus clock, since the signal BUS SYNC/ is transmitted for only one bus clock period. FIG. 8 shows as the next signal waveform that the signal REQUEST is fed within the arbiter 18 (FIG. 5) to the calculation time register 184. The calculation time register 184 in turn drives the circuit 183 of the arbiter 18, which delivers the output signal ALLOC CALCULATED. This in turn, in linkage with the ACCESS signal already described causes the allocation address ALLOCATION AD to be able to be given to the information valve signal lines 23. At the same time and for the same reason the signal ALLOCATION is generated. Both signal waveforms, are represented in FIG. 8 with the binary value zero in the active state. The two signals then cause the generation of the status signal BUS ALLOCATED in the requesting processor, for which purpose the circuit according to FIG. 4 is used. At the same time, in the manner already described, by way of the NAND element 126 shown in FIG. 5, the signal $\overline{\text{START ACC}}$ is generated, which in turn results in the end of the output signal delivered by the register 121, $\overline{\text{ACCESS FLAG}}$. By way of the information signal lines 23 the memory address for a memory access can then be transmitted, which has already been designated as $\overline{\text{AD}}$ in FIG. 8 and earlier in FIG. 7. The access time then runs, at the end of which the signals $\overline{\text{END ACC}}$ and $\overline{\text{DATA}}$ are transmitted, with which a read data item can then be transmitted further over the information value signal lines 23.

Figure 9:
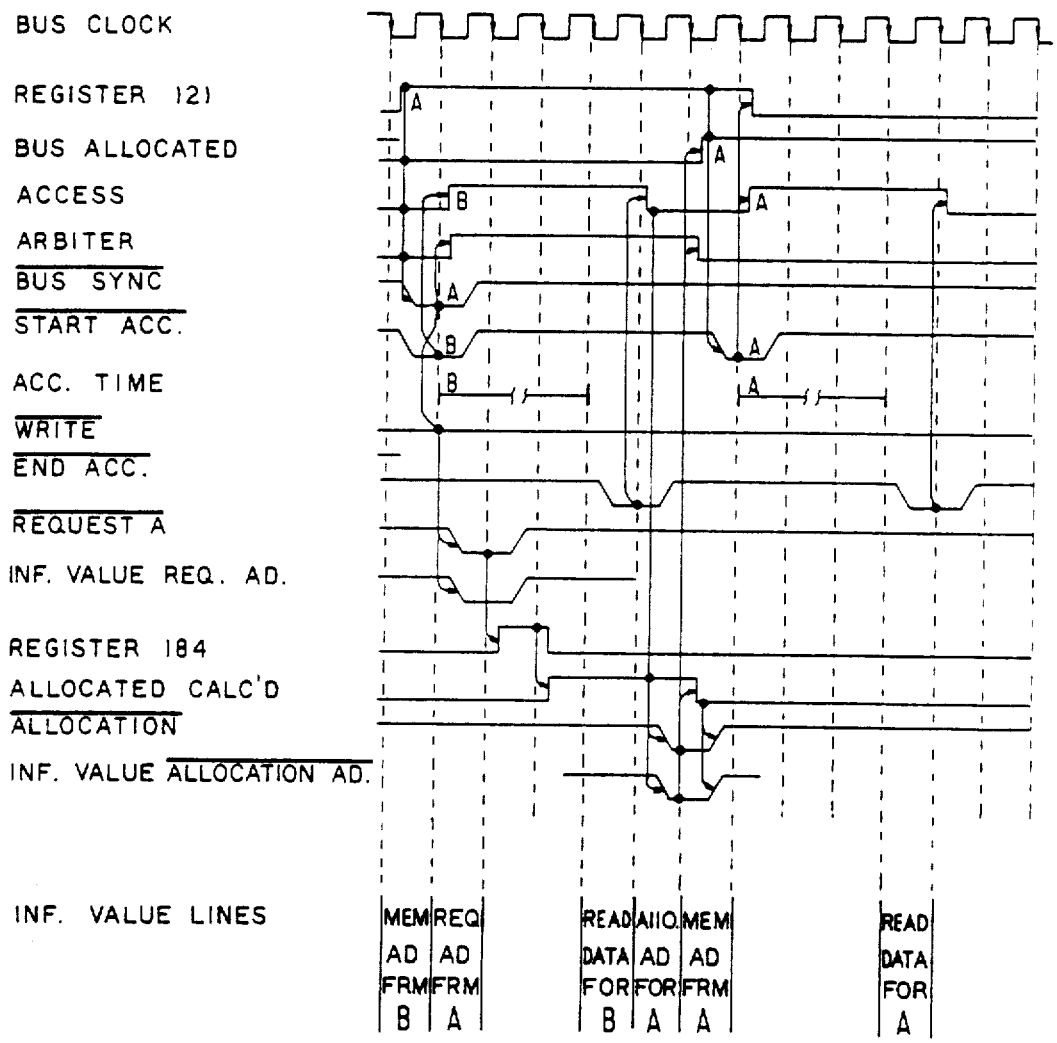

FIG. 9 represents the allocation process for a read access of a data processing unit A, for which it is assumed that the bus is not yet allocated to this unit A, but another unit B is starting with its read access. This means that the unit B is just transmitting its signal $\overline{\text{START ACC}}$. As a result of the linkage of the first four signal waveforms shown in FIG. 9, namely the output signal of the register 121, the absence of the status signal BUS ALLOCATED, the absence of the status $\overline{\text{AC CESS}}$ and the absence of the status $\overline{\text{ARBITER}}$, the signal $\overline{\text{BUS SYNC/}}$ is generated in the unit A in the manner already described, which signal sets the status ARBITER in all the units. At the same time however the signal ACCESS is generated by the signal $\overline{\text{START ACC}}$ of the unit B. The access time for the unit B now runs, and during this time a request of the unit A should now be carried out according to the assumption.

As a function of the information NO WRITING, which is given in the upper state of the signal $\overline{\text{WRITE}}$, and of the signal BUS SYNC, the signal $\overline{\text{REQUEST}}$ of the unit A is output and at the same time a request address is transmitted over the information value signal lines 23 in the manner described. Through the signal $\overline{\text{REQUEST}}$ of unit A, the register 184 of the arbiter 18 is set and the signal ALLOC CALCULATED is output as described. As a function of this signal as well as of the end of the signal ACCESS in the arbiter 18, the signal $\overline{\text{ALLOCATION}}$ is now given on the unit A and the allocation address is transmitted over the information value lines 23. FIG. 9 shows that by this process the signal BUS ALLOCATED is output in turn for the unit A and thereby in turn the signal $\overline{\text{START ACC}}$, but this is now generated for the unit A. Following this an access time then runs, which in FIG. 9 is characterized as being allocated to the unit A.

FIG. 9 in its lower part, for a better clarification of the processes described above, shows which signals are transmitted over the information value signal lines in time sequence. First, in the scope of a memory access, a memory address is transmitted from the unit B to another unit, which is followed by a request address of the unit A. During the access time of the unit B no transmission of data is then possible; only at its end are the read data transmitted to the unit B. Thereupon an allocation address for the unit A can be transmitted, so that this one, like the unit B, can deliver a memory address. An access time then runs, at the end of which the transmission of read data for the unit A takes place.

Figure 10:
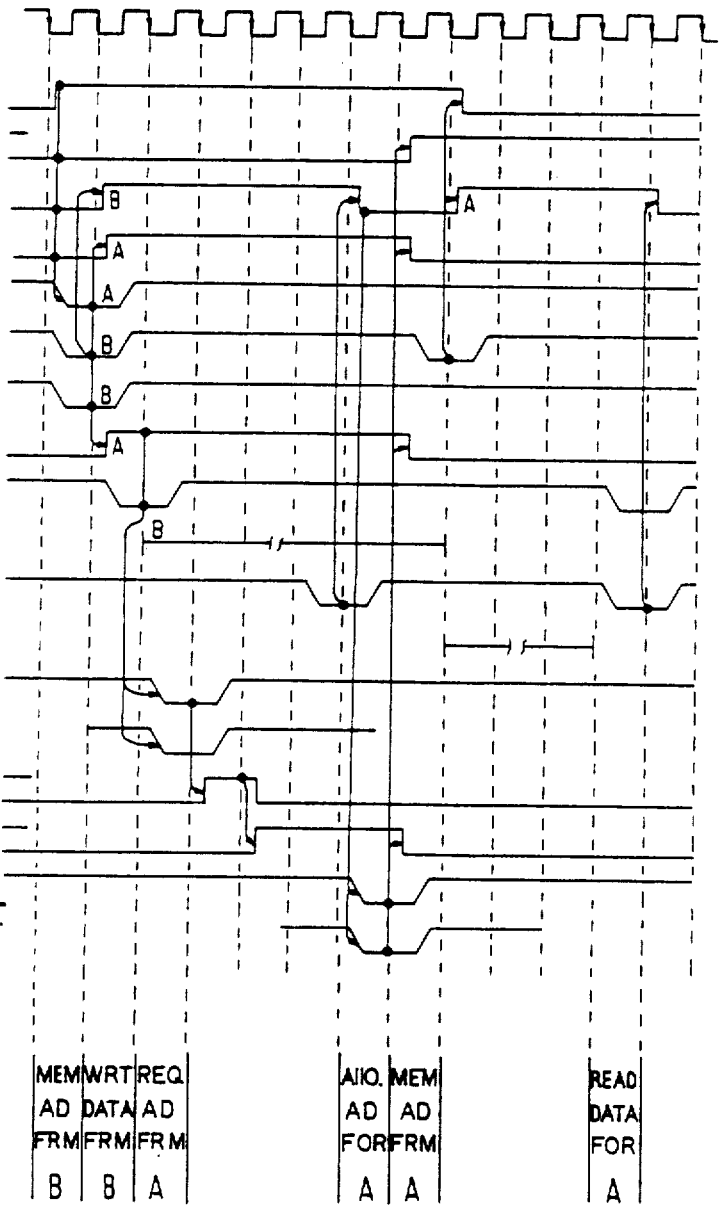

FIG. 10 shows an allocation process for a read access to be carried out with a unit A on the assumption that the bus is not yet allocated to the unit A and another unit B to which the bus is allocated is starting its write access. When the unit A expresses an access request, the register 121 of this unit A is then set, which in FIG. 10 is shown as the first signal form. Since the bus is not yet allocated to the unit A, the corresponding status signal BUS ALLOCATED is not present. Besides this there is as yet no memory access by the unit B in progress, for which reason the corresponding signal ACCESS is not yet present. Since the arbiter 18 is also not operating at this instant, as has already been described on the basis of FIG. 9, the information $\overline{\text{BUS SYNC/}}$ and the status ARBITER are generated in the unit A. At the same time an information signal $\overline{\text{START ACC}}$ of the unit B together with the information signal $\overline{\text{WRITE}}$ are generated in the unit B, and these three signal states have the result that the request flag 79 (FIG. 6) is also set by the signals SYNC E and STACC E (FIG. 6) at the same time as the start of the read access in the unit A. Thereby the write data can be transmitted before the transmission of the $\overline{\text{REQUEST}}$, with which the write time starts for the unit B and the assumed write access to another memory unit can run. The information type signal $\overline{\text{DATA}}$ and the request flag set then cause the transmission of the information type $\overline{\text{REQUEST}}$ and the request address $\overline{\text{REQUEST AD}}$ in the unit A. With the signal $\overline{\text{END ACC}}$ the status signal $\overline{\text{ACCESS}}$ is then ended in the arbiter 18, whereby in turn it can transmit the signal $\overline{\text{ALLOCATION}}$ to the unit A, which had delivered a request signal, and can transmit over the information value signal lines 23 the allocation address $\overline{\text{ALLOCATION AD}}$ which in the meantime has been calculated by the arbiter 18. With this, the signal $\overline{\text{AL LOC. CALCULATED}}$ is ended in the arbiter 18, the signal $\overline{\text{START ACC}}$ is set in the arbiter 18 and in the unit A and the signal ACCESS is caused for the unit A. Then an access time runs in the memory, after the expiration of which the signal $\overline{\text{END ACC}}$ appears and read data can be transmitted.

FIG. 10 in its bottom part shows the sequence in time of the signals which are transmitted over the information value signal lines 23. This first concerns a memory address which is transmitted by the unit B, whereupon this then conveys a write data item to the memory driven in this way. In the next succeeding clock interval a request address of the unit A occurs, after which the allocation in the arbiter 18 is carried out. At the end of this allocation an allocation address is output in the unit A, after which the arbiter 18 obtains from the memory the information $\overline{\text{END ACC}}$ which in turn delivers a memory address, in order to hold a memory with a read access. This is followed by the access time of the memory, whereupon in turn read data are transmitted from the memory driven in this manner, to the unit A.

For the preceding explanation of FIGS. 7 to 10 the following principle of the operating mode is assumed.

The information value signals are delivered from the respective active processor or from an addressed data processing unit in one data transmission action synchronously with the bus clock signals.

An addressed data processing unit transmits the information END ACC and if necessary the information type signal DATA together with the information value signal DATA. This process is explained in the following for one memory.

The memory is started with a read access with the occurrence of the information signal START ACC. After the end of the access time the memory transmits the information signals END ACC and DATA and also the information value signal DATA, for one bus clock period.

The memory is prepared for a write access with the information signals START ACC and WRITE, prepared for information to be written which follows. This is composed of the information type signal DATA and the information value signal DATA. These two signals must absolutely not occur with the first bus clock period after the signal START ACC. After the transmission of the data to be written, the write time begins. As a function of the physical properties of the memory, at least three clock pulse periods before the end of the write time the signal END ACC is delivered by the memory. These three bus clock periods are needed for the transmission of the signals END ACC and ALLOCATION as well as the address for the next access.

In the representation according to FIGS. 9 and 10, the signals BUS SYNC and REQUEST as well as the information value signal REQUEST AD have begun and ended as in FIG. 8, namely by control through the signals SYNC E AND STACC E.

Figure 11:
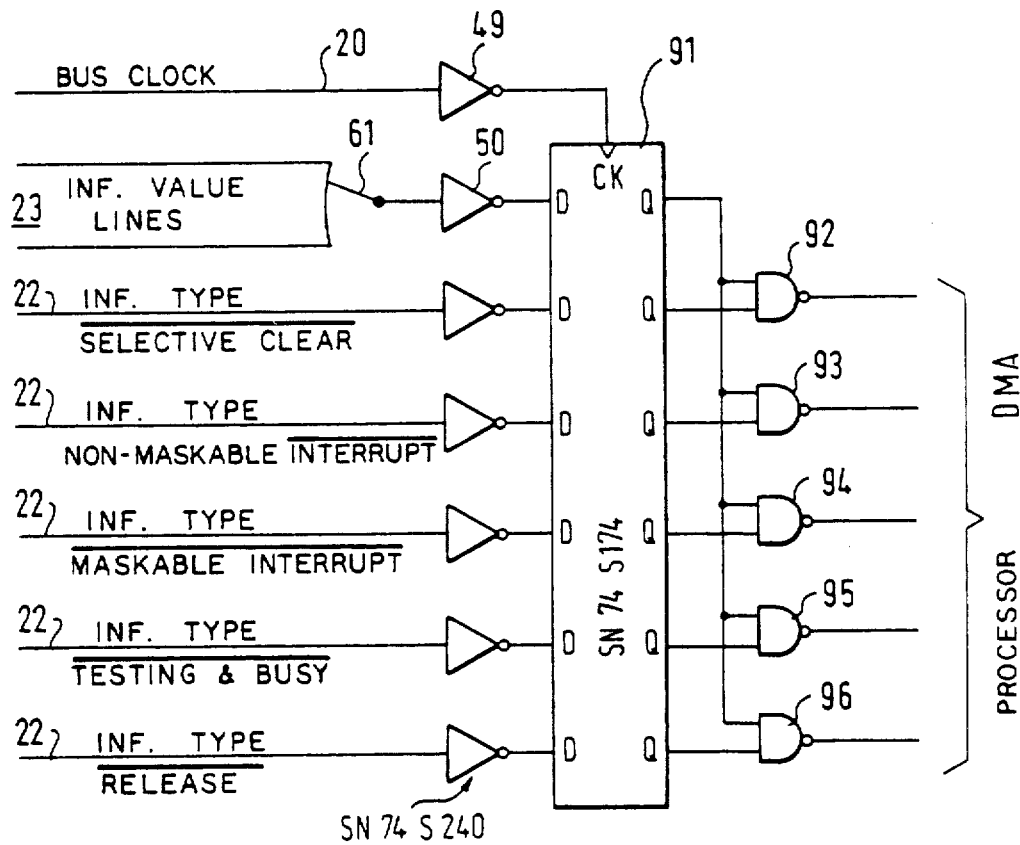
FIG. 11 shows an additional circuit for enlarging the types of operation of a processor.

FIG. 11 shows a very simple circuit arrangement extension of the arrangements which have already been explained on the basis of FIGS. 4 and 6. The mechanical selector switch 61 described there is also represented in FIG. 11 and is connected by way of an inverting receiver with a D input of a receiving register 91 of the SN74S174 type. The inverting receiver may for example be the receiver 50 shown in FIG. 4.

The register 91 is a single-edge controlled register and is timed by way of a bus clock signal line 20, where an inverting receiver is interconnected which for example is the receiver 49 according to FIG. 4. The mechanical switch 61 can connect the switches according to FIGS. 4, 6 and 11 with one another, whereby it is likewise recognized that the information value signal lines 23 assigned continuously by way of it can be utilized in multiple ways.

As was already explained, the continuously allotted information value signal line 23 can be utilized for addressing one or more processors directly, i.e. without decoding complexity, in time intervals in which no request signals or allocation signals are transmitted. In this manner, with directly addressed processors and with the use of a circuit principle achieved with the invention, operating steps can be carried out for which formerly either special decoding complexity or else additional signal lines were required. FIG. 11 shows, connected with further D inputs of the register 91, additional individual signal lines which are utilized as information type signal lines 22 and which, in view of the advantage of the direct addressing of the respective processor, represents an extremely slight additional complexity. According to the characterization of these additional signal lines, an address delivered over the information value signal line 23 to a processor is so characterized that for example a selective clearing, an interrupt operation, that is a maskable or nonmaskable interrupt operation, or else a test and busy operation for the allocation of production facilities such as for example printers or display units can be carried out. In the latter application an additional inputs provided for releasing production facilities.

Connected with the Q outputs of the register 91, corresponding to the information type input signals, upon receiving the respective correct address, are activatable NAND elements 92 to 96, which feed the signal to be through-connected by them to the respective processor or to a data processing unit.

I claim:

1. In a process of initializing an interface connection of one of a plurality of data processing devices to a centrally clock-actuated multiple line system (Bus) for the transmission of information signals between the data processing devices; wherein the devices requiring to be connected transmit their respective request signals via the multiple line system to at least one allocator (aribter), said allocator causing one of the devices requiring connection to be connected to the multiple line system by means of allocation signals generated by said allocator, so that the one of the plurality of data processing devices can transmit the information signals to others of the data processing devices, the improvement comprising:

transmitting the request signals on an existing connection during time intervals when other signals of said multiple line system indicate that no information signals are being transmitted via the multiple line system resulting from read-out and/or write-in operations in memories of the data processing devices;

generating the allocation signals during said time intervals and/or during transmission of information signals comprising data read from memories of the data processing devices; and said request signals, said allocation signals and said information signals all are transmitted via the same multiple line bus.

2. A process as set forth in claim 1, wherein the request signals, or the request signals and the allocation signals, are transmitted by signal lines of said multiple line system, said signal lines being permanently coupled to the respective requesting device.

3. A process as set forth in claim 2, wherein the permanently coupled to requesting devices signal lines are also being used for the transmission of information signals, particularly of address signals, which are serving for the direct activation of data processing devices.

4. A process as set forth in claim 1, wherein at least one of the data processing devices having a memory generates a status signal indicating the access time of the memory during a read-out operation, said status signal being applied to the multiple line system and used as a condition for the transmission of the request signals.

5. A process as set forth in claim 1 wherein central clock signals are generated from a central clock generator and applied to the multiple line system, with each period length of each clock signal corresponding to a transmission time via the multiple line system;

wherein the request signals are input from the multiple line system into synchronously loadable, single-edge controlled receiving registers in the at least one allocator;

wherein timing of the input of the request signals is determined by timing of edges of said clock signals;

and wherein control signals generated through other elements of said at least one allocator for said input of said request signals are directed to loading inlets of the receiving registers.

6. A process as set forth in claim 5, wherein only a signal line carrying the clock signals of the multiple line system is connected as a terminated line by operation said signal line with a signal driver of relatively high power output.

7. A process as set forth in claim 1, wherein if signals applied through the multiple line system are indicative that the multiple line system has not yet been allocated to any other data processing device, a data processing device requiring to be connected delivers preliminary information on a special information line of the multiple line system before transmitting the request signals, said preliminary information generating a status signal indicative of the allocation, said status signal being delivered to all the data processing devices belonging to the multiple line system, and said status signal causing the request signals to be transmitted from the data processing device requiring to be connected.

8. A process as set forth in claim 7, wherein said preliminary information is also used to present the allocator for purposes of receiving and processing the request signals.

9. A process as set forth in claim 7, wherein the preliminary information is derived from other status signals which, in the data processing devices requiring to be connected, indicate the lack of allocation of the multiple line system, an inoperative state of the allocator, and an absence of an access condition on the multiple line system, and are combined by logical circuit linkage within the data processing devices requiring to be connected with an access flag signal for indicating the connection requirement.

10. A process as set forth in claim 1, wherein a determination time is started in the allocator on receipt of the request signals, during which time the allocation signals are generated on the basis of an allocation determination and, on expiration thereof, a status signal indicating the allocation as determined is transmitted over the multiple line system together with the allocation signals; and in the data processing device making the request, the status signal indicating the allocation as determined causes access to another data processing device by means of the multiple line system.

* * * * *